(12) United States Patent
Bjorklund et al.

(10) Patent No.: US 6,629,675 B1
(45) Date of Patent: Oct. 7, 2003

(54) CABLE MANAGEMENT APPARATUS AND METHOD

(75) Inventors: Brian P. Bjorklund, Lilburn, GA (US); Kenneth F. Bugg, Decatur, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 94 days.

(21) Appl. No.: 09/873,742

(22) Filed: Jun. 4, 2001

(51) Int. Cl.[7] .................................................. F16L 3/22
(52) U.S. Cl. .......................................... 248/49; 248/68.1
(58) Field of Search ........................... 249/51, 49, 68.1, 249/72, 73, 315, 316.8, 74.1; 211/26

(56) References Cited

U.S. PATENT DOCUMENTS

| | | | | |
|---|---|---|---|---|
| 427,642 A | * | 5/1890 | Wack | 248/353 |
| 1,365,632 A | | 1/1921 | Pleister | 248/69 |
| 1,554,118 A | | 9/1925 | Moran | 248/103 |
| 1,602,503 A | | 10/1926 | Pleister et al. | |
| 1,763,060 A | | 6/1930 | Meyer | |
| 2,689,995 A | | 9/1954 | Smith | 24/243 |
| 2,711,872 A | | 6/1955 | Lampke | 248/103 |
| 2,749,068 A | | 6/1956 | Wayman | 248/72 |
| 2,814,861 A | | 12/1957 | O'Connell | |
| 3,204,908 A | | 9/1965 | Brown | 248/226 |
| 3,276,800 A | | 10/1966 | Loudon et al. | 287/189.35 |
| 3,652,780 A | * | 3/1972 | Wilson | 174/45 R |
| 3,659,319 A | | 5/1972 | Erickson | 24/73 |
| 3,820,758 A | * | 6/1974 | Berg, Jr. et al. | 256/10 |
| 4,097,015 A | * | 6/1978 | Frishman | 248/339 |
| D263,021 S | | 2/1982 | Siegfried | D6/373 |
| 4,526,428 A | | 7/1985 | Sachs | 339/14 R |
| 4,870,722 A | | 10/1989 | Shell, Jr. | 24/16 R |
| 4,903,929 A | | 2/1990 | Hoffman | 248/229 |
| 5,022,615 A | | 6/1991 | Parks | 248/74.1 |
| 5,169,099 A | | 12/1992 | Yang | 248/49 |
| D357,624 S | | 4/1995 | Ferdman | |
| D359,629 S | | 6/1995 | Korkowski | D6/403 |
| 5,697,811 A | * | 12/1997 | Pickles et al. | 439/532 |
| 5,738,312 A | | 4/1998 | Koch | 248/68.1 |
| 5,765,698 A | * | 6/1998 | Bullivant | 211/26 |
| 5,788,087 A | * | 8/1998 | Orlando | 211/26 |
| 5,794,895 A | * | 8/1998 | Besserer et al. | 248/73 |
| 5,868,362 A | | 2/1999 | Daoud | 248/71 |
| 5,893,539 A | * | 4/1999 | Tran et al. | 248/282.1 |
| 5,921,402 A | * | 7/1999 | Magenheimer | 211/26 |
| 6,102,214 A | * | 8/2000 | Mendoza | 211/26 |
| 6,170,784 B1 | * | 1/2001 | MacDonald et al. | 248/65 |
| 6,245,998 B1 | * | 6/2001 | Curry et al. | 174/72 A |
| 6,494,411 B1 | | 12/2002 | Bjorklund | |

* cited by examiner

Primary Examiner—Ramon O. Ramirez
Assistant Examiner—Kofi Schulterbrandt
(74) Attorney, Agent, or Firm—Kirkpatrick & Lockhart LLP (57) ABSTRACT

A cable-supporting apparatus is disclosed. One embodiment of the invention includes a rigid support member that may be attached to a framework that supports one or more components. At least one cable support member is attached to the rigid support member for receiving a portion of at least one cable therethrough. The cable support members may comprise split rings that each define central cable-receiving area that is surrounded by rigid portions of the split ring.

35 Claims, 9 Drawing Sheets

CABLE MANAGEMENT APPARATUS AND METHOD

CROSS-REFERENCE TO RELATED APPLICATIONS

Not applicable.

FEDERALLY SPONSORED RESEARCH

Not applicable.

BACKGROUND OF THE INVENTION

1. Field of the Invention

The subject invention relates to guides and support members for members such as wires, cables and conduits and, more particularly, to guides for supporting multiple wires and/or cables while providing easy access thereto.

2. Description of the Invention Background

One might surmise that there are millions of miles of wires and cables distributed throughout the world for transmitting a variety of different electrical, optical, data, etc. signals between pieces of equipment. Regardless of the type of signal involved, a common installation scenario may involve one or more common locations wherein several of such wires and cables are brought together for interconnection with various electrical or optical components and/or other wires and cables. Junction boxes, electrical cabinets and racks of electrical components are examples of such locations.

In applications wherein several wires and cables must enter a cabinet, junction box, etc., it is often difficult for the electricians and installers to manage the distribution of the wires into and out of the cabinet in an orderly manner so that the components to which the wires are attached may be easily and safely accessed and so that a specific wire or wires to be easily traced as needed. In the past, wire trays have been employed for supporting a plurality of wires and cables entering an electrical cabinet. A common wire tray may comprise an elongated trough that is sized to receive a plurality of wires therein. In some applications, the tops of the trays are left open and the wires are simply laid in the tray. If desired, a cover may be placed over the tray. Such trays, because of their enclosed nature, hamper quick identification of a specific wire or wires and, if placed in a vertical orientation, are commonly covered to retain the wires within the tray.

Although the above-mentioned wire and cable management problems occur wherever several wires and cables enter a cabinet, junction box, rack, etc. and are essentially encountered in one form or another in all industries, one industry wherein such problems can be particularly acute is in the telecommunications industry. For example with the advent of the Internet, a practice employed in the telecommunications industry involves the use of digital subscriber lines ("DSL") that allow data to be transmitted over a dedicated digital circuit using ordinary copper telephone lines between a business or a residence and an Internet service provider. DSL technology transmits at higher speeds than traditional analog technology. In situations wherein a customer is located a great distance from the central office, conventional analog call-switching equipment along with digital modems known as DSL multiplexers, sometimes referred to as "D-slams" are employed in connection with remote terminal arrangements that contain all of the telephone lines servicing a particular geographical area.

Figure 1:
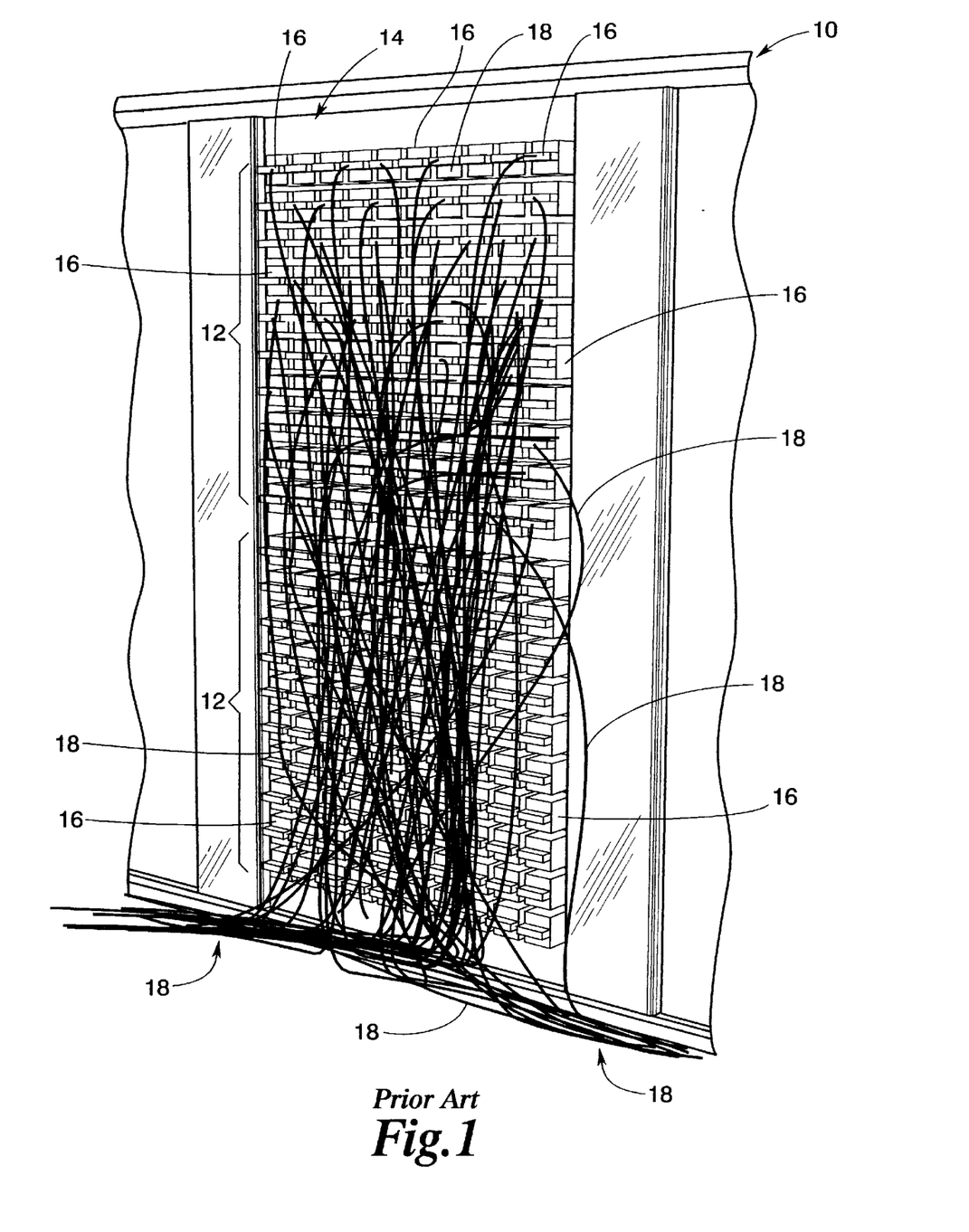
FIG. 1 is a partial perspective view of a pair of typical protector bays employed in the telecommunications industry.
Figure 2:
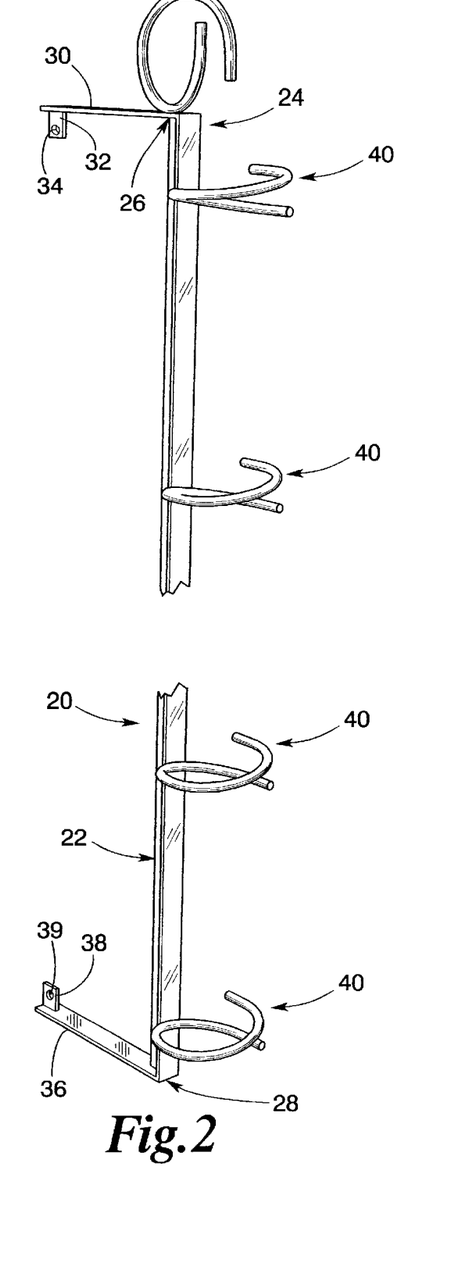
FIG. 2 is a partial perspective view of one embodiment of the cable support apparatus of the present invention.
Figure 3:
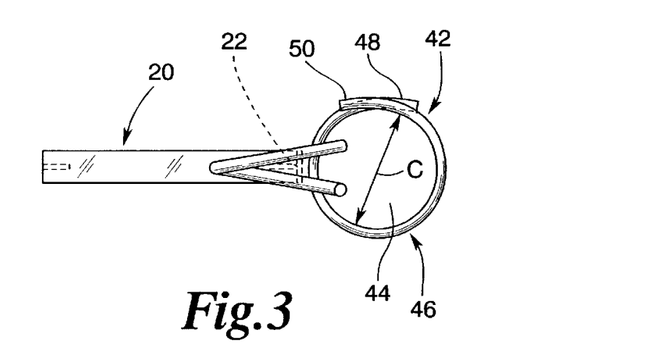
FIG. 3 is a top view of the cable support apparatus of FIG. 2.
Figure 4:
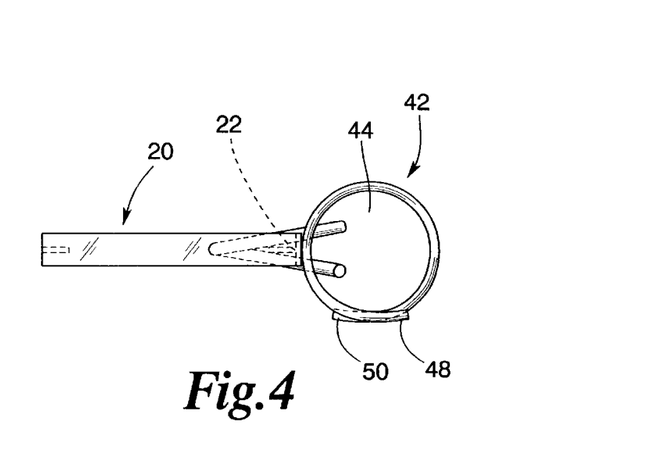
FIG. 4 is a bottom view of the cable support apparatus of FIGS. 2 and 3.
Figure 5:
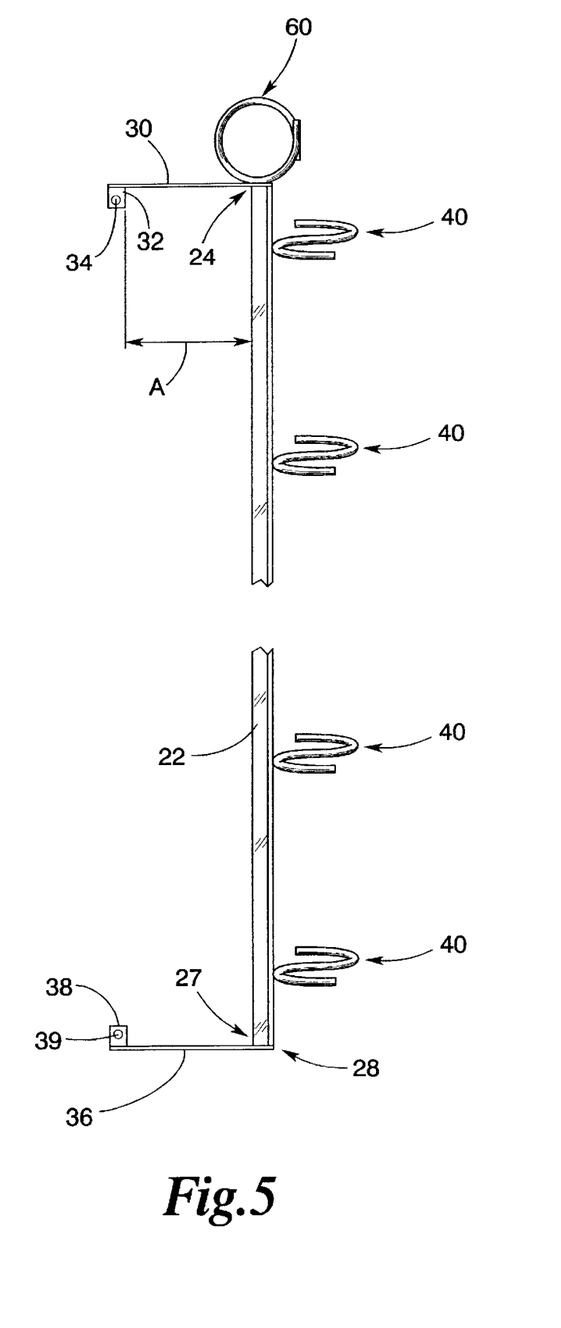
FIG. 5 is a partial side elevational view of the cable support apparatus of FIGS. 2–4.

FIG. 1 illustrates some of the equipment commonly installed within a remote terminal 10. Located within the remote terminal are a number of protector bays 12 that are mounted to a framework 14 that permits each bay to be partially pivoted relative to the framework 14 to permit access in to the rear of the bay 12. Each protector bay 12 comprises a 100 fuses 16 commonly referred to as "protector blocks". When used, each protector block 16 may have as many as four cables 18 which transmit the telephone and ADSL signals. FIG. 1 depicts several of such wires 18 attached to various protector blocks 16. The reader will appreciate that such mass of wires 18 will increase as more of the protector blocks 16 are employed. Such mass of wires 18 hanging in front of the protector bays 12 makes it difficult and time consuming to locate a particular protector block 16 and trace the wires 18 attached to that particular protector block.

Thus, there is a need for a cable management apparatus for supporting the wires attached to the various protector blocks in a protector bay that supports the wires away from the front of the protector bays providing easy access to the protector blocks therein.

There is a further need for a cable support apparatus that has the above-mentioned features and that permits wires to be inserted into the cable support apparatus and removed therefrom without the use of tools.

There is still another need for a cable support apparatus that has one or more of the above-mentioned features and that permits the wires to be easily observed and identified without having to be removed from the apparatus.

There is another need for a cable support apparatus that has one or more of the above-mentioned features and that is relatively inexpensive to manufacture and easy to install.

Another need exists for a cable support apparatus that has one or more of the above-mentioned features and that can be effectively employed in connection with other wire and cable management applications.

Yet another need exists for a support apparatus that may be advantageously used to support a myriad of different types of flexible members and/or conduits.

SUMMARY OF THE INVENTION

In accordance with one form of the present invention, there is provided a cable support apparatus that includes an elongated support member that has at least one cable-receiving support member attached thereto. The cable-receiving support member defines a cable-receiving area that has a perimeter that is surrounded by a rigid barrier. The rigid barrier has an opening therethrough through which at least one cable may be inserted.

Another embodiment of the present invention comprises a cable support apparatus that includes an elongated support member and at least one cable-receiving split ring attached to the elongated support member.

Yet another embodiment of the present invention comprises a cable supporting apparatus that includes an elongated rigid support member that has a first end and a second end. A first attachment member is attached to the first end of the elongated rigid support member and a second attachment member is attached to the second end of the elongated rigid support member. Ten spaced-apart split rings are attached to the elongated rigid support member and at least one auxiliary split ring is attached to one of the first and second attachment members.

Another embodiment of the present invention comprises a method of supporting a plurality of cables that are attached to electrical components supported by a framework. The method includes attaching a rigid support member to at least a portion of the framework adjacent to at least some components wherein the rigid support member has at least one cable-receiving split ring attached thereto that defines a central cable-receiving area and has an opening through which at least one cable may be inserted into the cable-receiving area. The method also includes inserting a plurality of cables attached to the at least some components into the cable-receiving area of at least one split ring.

Those of ordinary skill in the art will appreciate that the various embodiments of the present invention provide unique and novel methods of organizing and supporting a plurality of cables that are attached to components supported within a framework. It will be further appreciated that the various embodiments of the present invention may find utility in applications wherein it is desirous for support various other types of flexible and nonflexible members and conduits. These details, features and advantages will become further apparent as the following detailed description of the embodiments proceeds.

BRIEF DESCRIPTION OF THE DRAWINGS

In the accompanying Figures, there are shown present embodiments of the invention wherein like reference numerals are employed to designate like parts and wherein.

DETAILED DESCRIPTION OF THE EMBODIMENTS OF THE INVENTION

Referring now to the drawings for the purposes of illustrating the present preferred embodiments of the invention only and not for the purposes of limiting the same, the Figures illustrate embodiments of the present invention that may be used in connection with managing a plurality of wires/cables 18 attached to protector blocks 16 employed in the telecommunications industry. As the present Detailed Description proceeds, those of ordinary skill in the art will appreciate that the various embodiments of the present invention may be employed in a variety of settings and applications wherein it may be advantageous to support a plurality of wires, cables, flexible conduits, etc. in an orderly fashion. Thus, the scope of protection afforded to the various embodiments of the present invention should not be limited to use in connection with the protector bays employed in connection with various telecommunications applications. Furthermore, the various embodiments are described herein as being adapted for use with "cables". As used herein, the term "cables" may refer to conductors covered with an insulating medium. The term "cables" may also refer to flexible mediums for supporting optical signals, i.e., fiber optic cables. The term "cables" may encompass flexible conduits used to transfer fluid or liquid mediums, etc. Thus, the present invention finds utility in the management of a variety of different flexible and non-flexible transfer mediums and thus, should not be limited solely to use with electrical cables and wires. As used herein, the term "framework" may encompass any structure that supports one or more components to which one or more "cables" are attached such as, but not limited to, junction boxes, electrical cabinets, electrical racks, ladder racks, valve racks, etc.

FIGS. 2–8, illustrate one embodiment of the present invention. As can be seen in those Figures, the cable management apparatus 20 includes an elongated support member 22 with a plurality of cable-receiving support members 40 attached thereto in spaced-apart relationship to each other. In the embodiment shown in FIGS. 2–8, the elongated support member 22 has a "T-shaped" cross-section. In one embodiment, the elongated support member 22 is fabricated from steel. However, the elongated support member 22 may be fabricated from a variety of different metals such as aluminum, stainless steel, etc. Furthermore, the elongated support member 22 may be fabricated from a polymer or plastic material.

Figure 7:
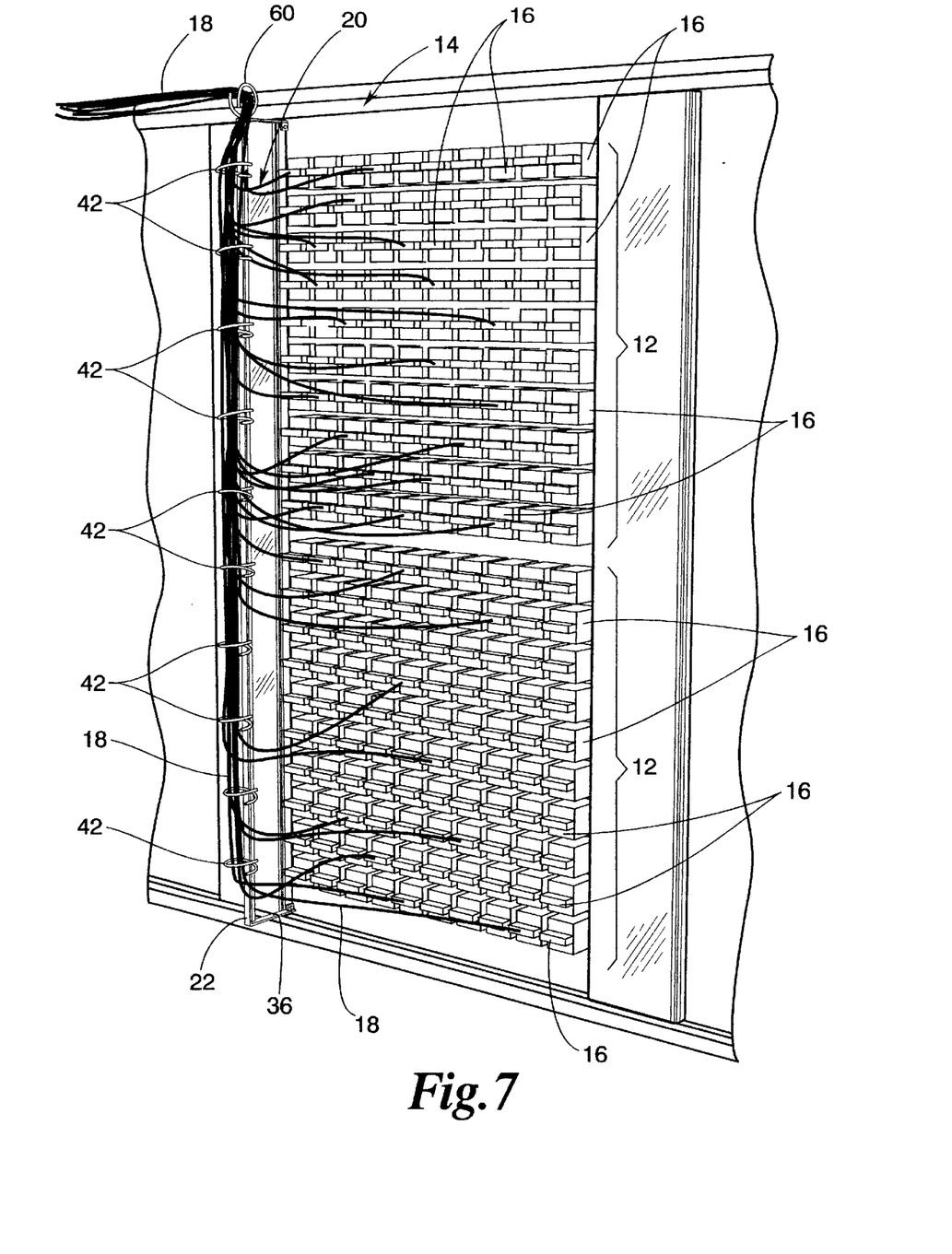
FIG. 7 is a partial perspective view of a pair of typical protector bays with one embodiment of the present invention used in connection therewith.

The elongated support member 22 may be have a length that enables it to span the distance from a bottom portion of the framework 14 supporting the protector bays 12 as shown in FIG. 7 to a top portion of the framework 14. In that embodiment, for example, the elongated support member 22 is approximately 75 inches long. Those of ordinary skill in the art will of course appreciate, however, that the elongated support member 22 may be fabricated in essentially any length that is best suited for a particular application without departing from the spirit and scope of the present invention.

In this embodiment, a first attachment member 30 is attached to a "first" portion 24 of the elongated support member 22 to facilitate attachment of that portion of the elongated support member 22 to a corresponding portion of the framework 14 or other convenient structure. In this embodiment, the first attachment member 30 is attached to a "first" end 26 of the elongated support member 22. The first attachment member 30 may be fabricated from a piece of flat steel or other material that is compatible with the material comprising the elongated support member 22. It will also be appreciated that other shapes of materials could be used to fabricate the attachment member 30. The first attachment member 30 is attached to the first end 26 of the elongated support member 22 by appropriate fastening means such as welding, screws, adhesive, etc. To further facilitate attachment to the framework 14 or other support structure, one or more first attachment tabs 32 are attached to the free end of the first attachment member 30. Each attachment tab 32 may have one or more holes 34 therethrough for receiving a fastener such as a screw, bolt, etc. In applications wherein the subject invention is to be attached to the framework 14 or other support structure supporting a plurality of protector bays 12, the first attachment tab 32 may be located approximately four inches away from the rear portion of the elongated support member 22 (distance "A" in FIG. 5).

In applications wherein it is desirous to support the elongated support member 22 at a plurality of points, one or more second attachment members 36 may be affixed at various "second" positions 27 along the elongated support member 22. In the embodiment depicted in FIGS. 2–8, a second attachment member 36 is attached to a second end 28 of the elongated support member 22. The second attachment member 36 may be identical to the first attachment members 30. Each second attachment member 36 may have a second attachment tab 38 with one or more screw holes 39 therethrough for receiving fasteners such as, for example, screws, bolts, rivets, etc. (designated as 39'). Those of ordinary skill in the art will appreciate that the elongated support member 22 may be affixed to a variety of different support structures by a myriad of different attachment structures and configurations without departing form the spirit and scope of the present invention. For example, one or several attachment members may be attached along the length of the elongated support member 22 for supporting it in a desired orientation. Moreover, depending upon the desired orientation of the cable support apparatus 20 and the adjacent structures, it is conceivable that the ends 26 and 28 of the elongated support member 22 could be supported in sockets or other members attached to the adjacent support structures to support the cable support apparatus in a variety of desired orientations. Likewise, the elongated support member 22 may be so oriented that the first rigid support member may be supported directly on an adjacent support structure end, if desired, directed affixed thereto. Thus, the subject invention should not be limited to apparatuses that have one or more attachment members affixed thereto.

One embodiment of the present invention includes at least one and, preferably ten, cable-receiving support members 40. The cable-receiving support members 40 in this embodiment each comprise a split ring member 42 that defines a central cable-receiving area, generally designated as 44 that is encircled by a rigid barrier, generally designated as 46 in FIGS. 3 and 4. More particularly and with reference to FIGS. 3–6, a split ring member 42 has two end portions 48, 50 that are spaced from each other a distance "B" that permits cables 18 to be inserted therebetween and entered into the center area of the split ring member. In one embodiment, for example, the distance between the ends of the split ring 42 may be spaced apart from each other approximately one ⅜ inch from each other (distance "B" in FIG. 6) or any other suitable distance to permit a cable to pass therebetween. In one embodiment, each split ring 42 is fabricated from ¼" steel round stock such that the center area 44 has an approximate inner diameter of three inches (distance "C" in FIG. 3). Those of ordinary skill in the art will appreciate, however, that the split rings 42 may be fabricated from a variety of different materials and have a variety of different shapes (i.e., rectangular, square, triangular, octagonal, etc.) and sizes best suited for supporting the particular size and numbers of cables 18 employed. For example, the split rings 42 may be fabricated from steel, stainless steel, aluminum, plastic, etc. and have a rectangular, square, etc. shape when viewed from above. The split rings 42 are attached to the elongated support member 22 by mechanical fastening means and methods that are appropriate for the types and sizes of materials from which the elongated support member 22 and the split rings 42 are fabricated. For example, when those components are fabricated from a metal material, the split rings 42 may be welded to the elongated support member 22. However, the split rings 42 may be attached to the elongated support member 22 by screws, clamps, bolts, adhesive, etc.

In the embodiment depicted in FIGS. 2–8, the split rings 42 are spaced from each other approximately eight inches (distance "D" in FIG. 6) for each other. Such spacing serves to locate the split rings 42 in positions that are advantageous when utilizing the cable support apparatus 20 in connection with protector bays 12 as shown in FIG. 9. However, those of ordinary skill in the art will appreciate that the number, size and spacing of the split rings 42 may be tailored to the specific application in which it is to be used.

Figure 6:
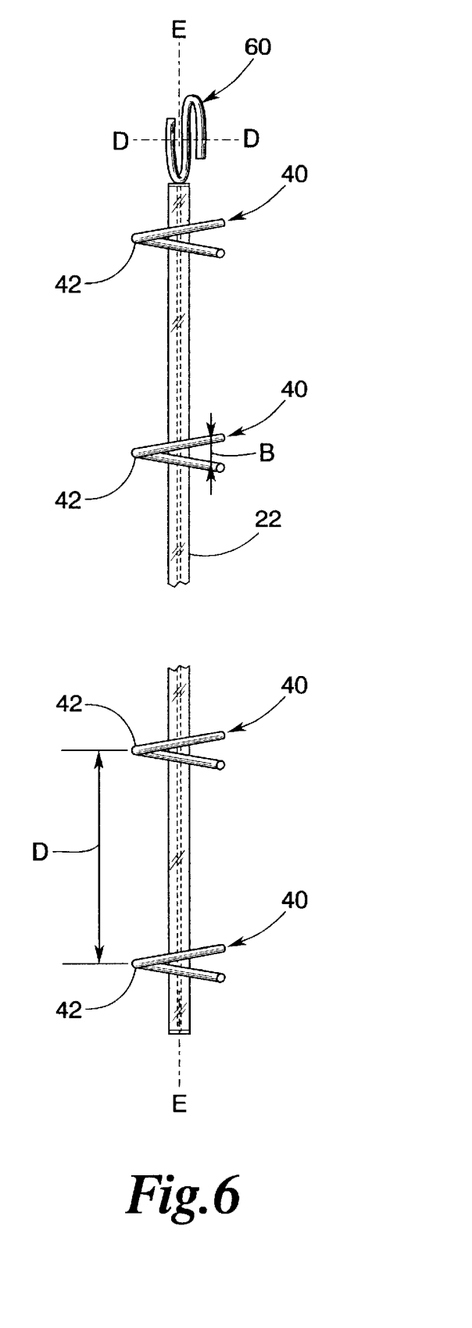
FIG. 6 is a partial front elevational view of the cable support apparatus of FIGS. 2–5.
Figure 10:
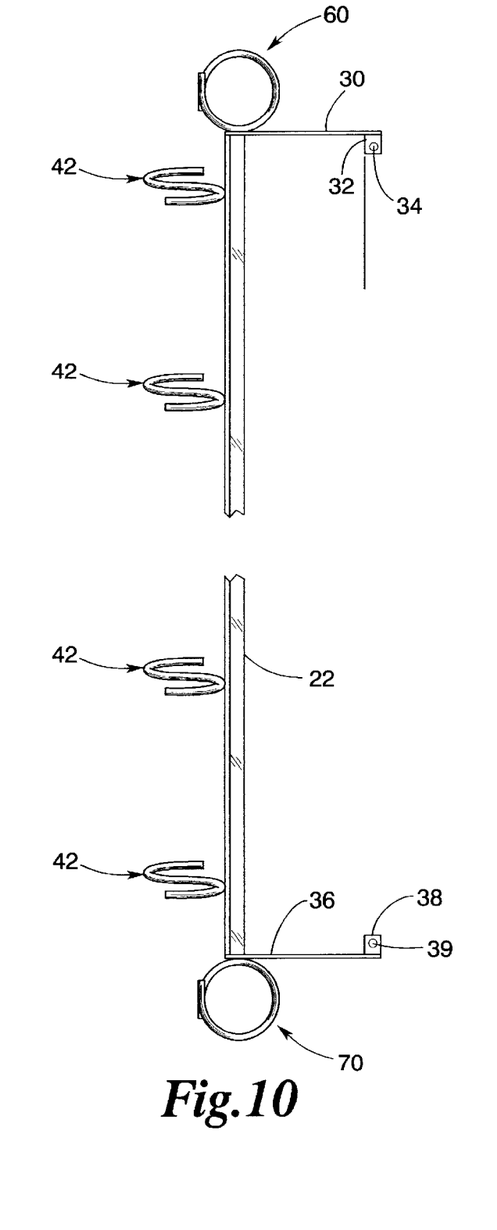
FIG. 10 is a partial side elevational view of another embodiment of the present invention.

Also, in the embodiments depicted in FIGS. 2–8, at least one auxiliary split ring 60 may be attached to the first attachment member for supporting cables along a plane that intersects a plane defined by the elongated support member 22. More particularly, as shown in FIG. 6, in this embodiment, the central axis D—D of the split ring 60 is approximately perpendicular to central axis e-E of the split rings 42. It will be appreciated, however, that the auxiliary split rings 60 may be affixed to the first attachment member 30 in a variety of orientations depending upon the particular application. It will be further appreciated that one or more second auxiliary split rings 70 may be affixed to the second attachment member 36 is desired. See FIG. 10. The first and second auxiliary split rings (60, 70) may be identical in size and shape as the split rings 42. However, one or more of the first and/or second auxiliary split rings (60, 70) may have a size and shape that differs from the size and shape of the split rings 42.

Figure 11:
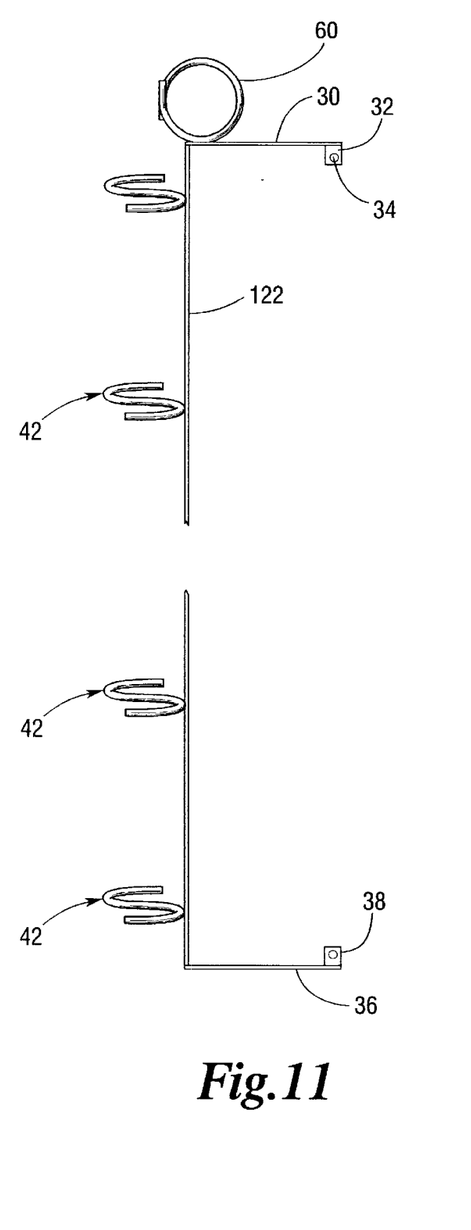
FIG. 11 is a partial side elevational view of another embodiment of the present invention.
Figure 12:
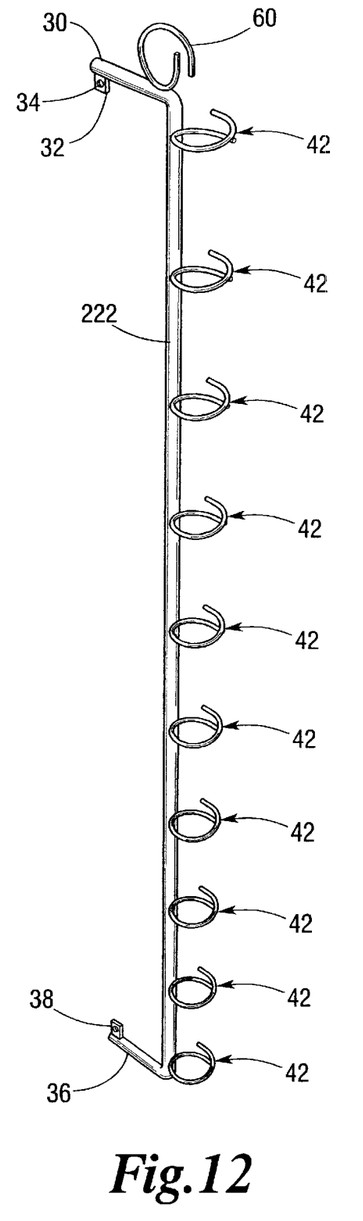
FIG. 12 is a partial side elevational view of another embodiment of the present invention.
Figure 13:
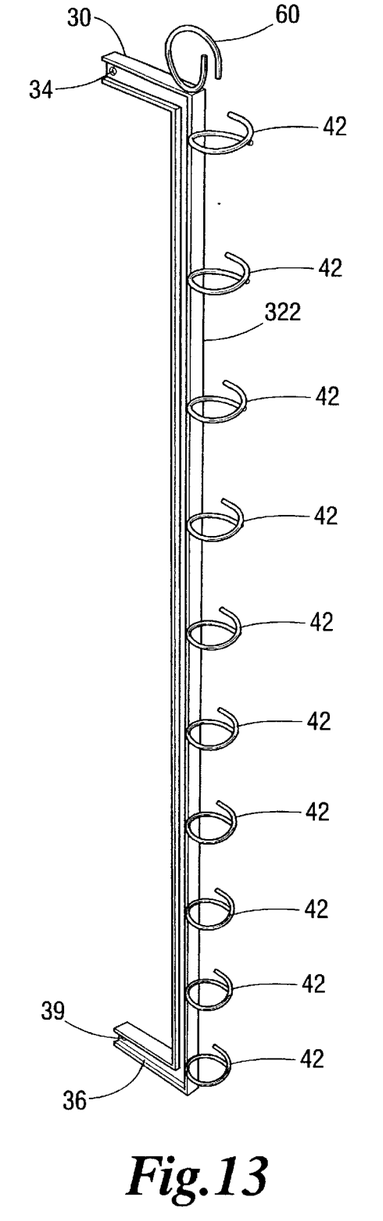
FIG. 13 is a partial side elevational view of another embodiment of the present invention.

The skilled artisan will also appreciate that the elongated support member 22 may be fabricated from a variety of different shaped materials. For example, the first elongated support member 122 may be fabricated from a flat piece of material of the types described above as shown in FIG. 11. In an alternative embodiment, the elongated support member 222 is fabricated from a material having a round cross-section as shown in FIG. 12. Likewise, the elongated support member 322 may have a cross-sectional shape in the form of an "I". See FIG. 13. Such cross-sectional shapes of the types described above may be solid or hollow. The elongated support member could also have a cross-sectional shape which is, for example, triangular shaped or C-shaped. Such list of shapes is not meant to be exhaustive but is merely illustrative of the various types of shapes that could be employed. The cable-receiving members 42 could also have other cross-sectional shapes.

Figure 14:
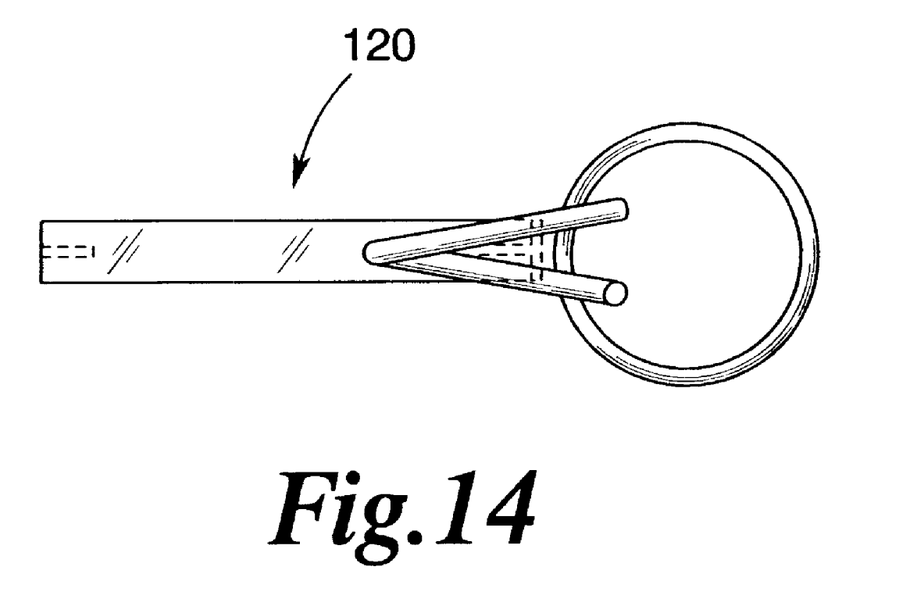
FIG. 14 is a top view of another embodiment of the present invention.

In an alternative embodiment as illustrated in FIG. 14, complete rings 142 may replace on ore more of the split rings 42. The remaining portions of the cable support device 120 may be substantially identical to the cable support apparatus 20 as described above. In this embodiment, however, one end of each cable would have to be fed through the ring 142 during installation. Also, if desired the apparatus could have one or more split rings and one or more complete rings, depending upon a particular application.

Figure 8:
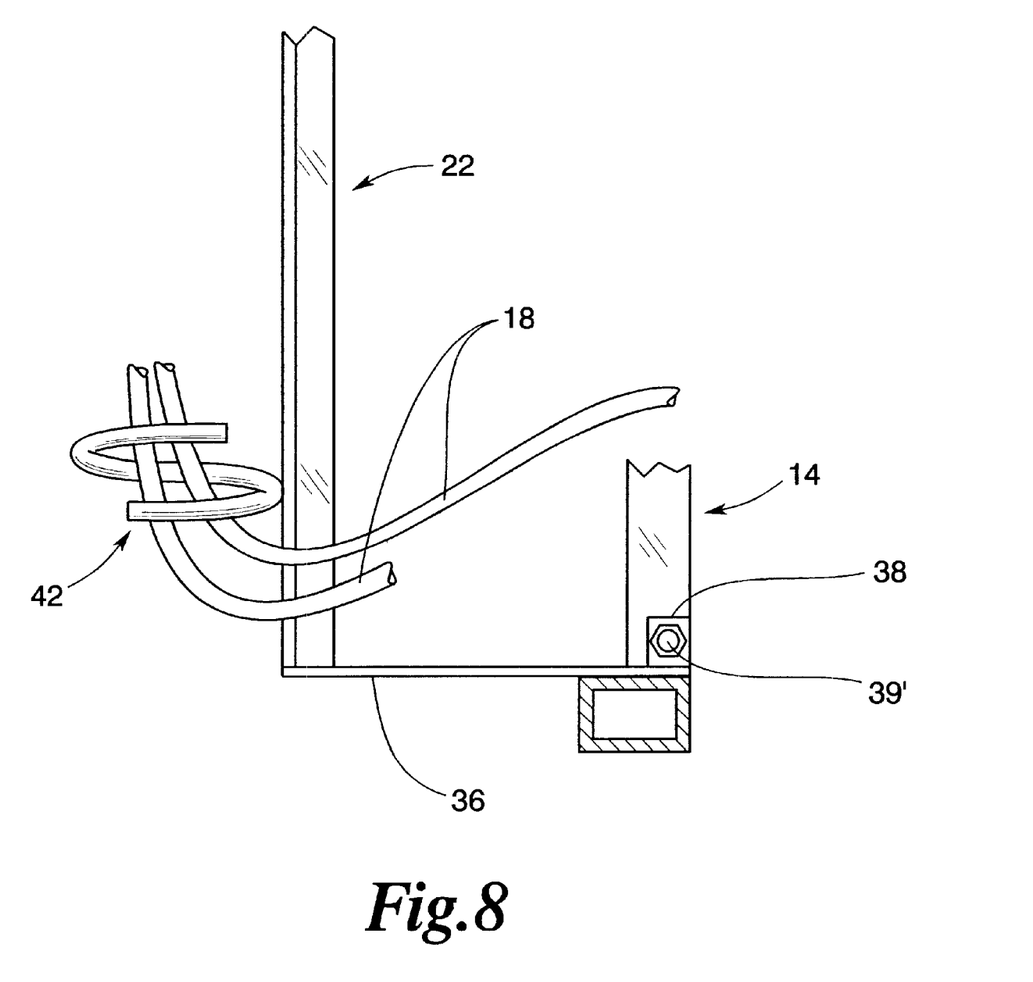
FIG. 8 is a partial enlarged view of one end of the cable support apparatus of FIGS. 2–7 attached to a portion of framework supporting the protector bays depicted in FIG. 7.
Figure 9:
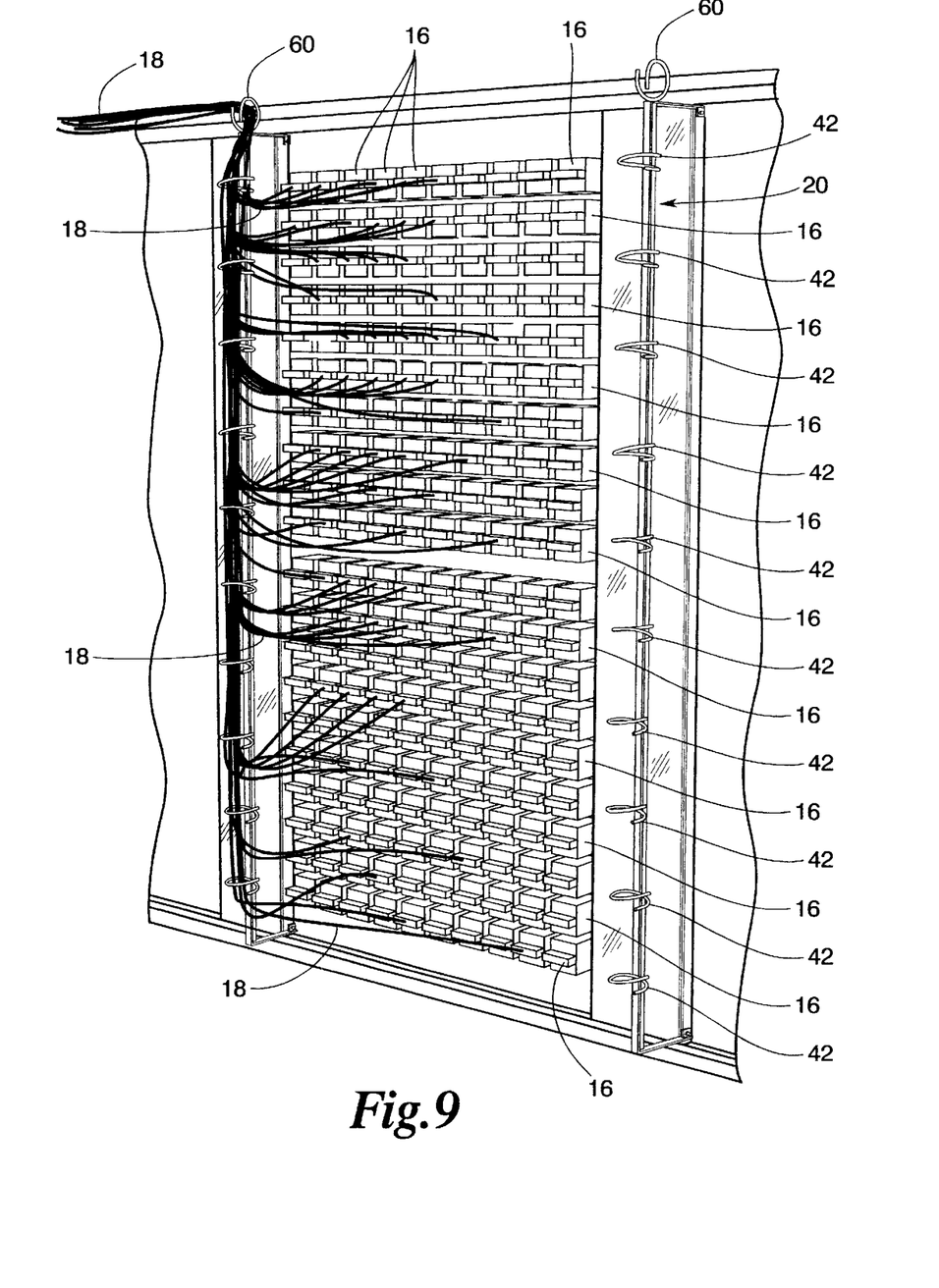
FIG. 9 is another partial perspective view of a pair of protector bays with two embodiments of the present invention used in connection therewith prior to supporting cables through one of the cable support apparatuses.

FIGS. 7 and 8, illustrate one of the many uses of the cable management apparatus 20 of the present invention. As can be seen in that Figure, the apparatus 20 is used in connection with a plurality of protector bays 12 that contain a plurality of protector blocks 16. The protector bays 12 are movably supported by a framework, generally designated as 14. In this embodiment, the first attachment member 30 is affixed to one portion of the framework 14 by a screw 39' that extends through the hole 34 in the attachment tab 32 and engages a portion of the framework 14. Likewise, the second attachment member 36 is attached to another portion of the framework 14 by another screw 39' that extends through the hole 39 in the attachment tab 38 to engage a portion of the framework 14. As can be seen in that Figure, a plurality of cables 18 are inserted through the space between the ends of the split rings 42 such that they can enter the center area thereof and be retained therein as shown. As evidenced by FIG. 8, by employing the present invention, much of the clutter and obstruction of the various protector blocks is minimized and eliminated while permitting easy access and removal of the various cables as desired. FIG. 9, illustrates the use of two cable support apparatuses 20, one on each side of the protector bay. Those of ordinary skill in the art will appreciate that by using split rings 42, the apparatuses 20 may be installed after both ends of the cables 18 have been connected to components and the cables may be inserted into the central areas defined by the split rings 42 without detaching any of the wires. Thus, the apparatus 20 may be retrofitted into existing wiring and cable applications.

Thus, from the foregoing discussion, it is apparent that the present invention solves many of the problems encountered when installing wires and cables in junction boxes and cabinets. Those of ordinary skill in the art will, of course, appreciate that various changes in the details, materials and arrangement of parts which have been herein described and illustrated in order to explain the nature of the invention may be made by the skilled artisan within the principle and scope of the invention as expressed in the appended claims.

What is claimed is:

1. A cable support apparatus, comprising:

an elongated support member;

at least one cable-receiving support member attached to said elongated support member, said at least one cable-receiving support member defining a cable-receiving area having a perimeter surrounded by a rigid barrier, said rigid barrier having an opening therethrough through which at least one cable may be inserted;

at least one attachment member non-movably attached to said elongated support member; and at least one auxiliary cable-receiving support member attached to at least one said attachment member.

2. The apparatus of claim 1 wherein said at least one attachment member comprises:

a first attachment member non-movably attached to one end of said elongated support member; and a second attachment member non-movably attached to another end of said elongated support member.

3. The apparatus of claim 2 further comprising:

a first attachment tab attached to at least one said first attachment member; and a second attachment tab attached to at least one said second attachment member.

4. The apparatus of claim 3 further comprising at least one fastener hole through each said first and second attachment tabs.

5. A cable support apparatus, comprising:

an elongated support member;

at least one cable-receiving split ring attached to said elongated support member;

at least one attachment member non-movably attached to said elongated support member; and at least one auxiliary split ring attached to at least one said attachment member.

6. The apparatus of claim 5 wherein at least one said cable-receiving split ring has two overlapping ends that are spaced apart from each other.

7. The apparatus of claim 6 wherein at least one said cable-receiving split ring has a substantially round shape.

8. The apparatus of claim 5 wherein a plurality of cable-receiving split rings are attached to said elongated support member at substantially equal distances from each other.

9. The apparatus of claim 5 wherein said at least one attachment member comprises:

a first attachment member non-movably attached to one end of said elongated support member; and a second attachment member non-movably attached to another end of said elongated support member.

10. The apparatus of claim 9 further comprising:

a first attachment tab attached to at least one said first attachment member; and a second attachment tab attached to at least one said second attachment member.

11. The apparatus of claim 10 further comprising at least one fastener hole through each said first and second attachment tabs.

12. The apparatus of claim 9 further comprising at least one auxiliary split ring attached to said first attachment member and at least one other auxiliary split ring attached to said second attachment member.

13. The cable support apparatus of claim 5 wherein said at least one cable-receiving split ring comprises a plurality of split rings attached to said elongated support member in spaced apart relationship to each other and coaxially aligned along a first axis and wherein at least one said auxiliary split ring has a center axis that is substantially perpendicular to said first axis.

14. The apparatus of claim 5 wherein at least one said cable-receiving split ring is fabricated from a metal rod.

15. The apparatus of claim 5 wherein said elongated support member has a cross-sectional selected from the group of cross-sectionals shapes consisting of T-shaped, I-shaped, rectangular-shaped, and circular-shaped.

16. The apparatus of claim 5 wherein said elongated support member is fabricated from a material selected from the group of materials consisting of steel, stainless steel, aluminum, and plastic.

17. A cable support apparatus comprising:

an elongated support means;

at least one means for supporting a cable attached to said elongated support means, said at least one means for supporting a cable defining a central cable-receiving area that is surrounded by rigid portions of said at least one means for supporting;

at least one attachment means for attaching said elongated support means to a structure, said attachment means non-movably attached to said elongated support means; and at least one auxiliary means for supporting a cable attached to at least one said attachment means.

18. The cable supporting apparatus of claim 17 further comprising access means for permitting a portion of a cable to be inserted between said rigid portions and into said central cable receiving area.

19. A cable supporting apparatus, comprising:
a plurality of rigid members for supporting a cable therein;
means for attaching said plurality of rigid members to a structure as a rigid non-articulatable unit; and
at least one additional rigid member for supporting a cable therein attached to at least one said means for attaching.

20. A cable support apparatus, comprising:
an elongated rigid support member having a first end and a second end;
a first attachment member non-movably attached to said first end of said elongated rigid support member;
a second attachment member non-movably attached to said second end of said elongated rigid support member;
ten spaced apart split rings attached to said elongated rigid support member; and
at least one auxiliary split ring attached to one of said first and second attachment members.

21. A method of supporting a plurality of cables attached to components supported by a framework, said method comprising:
attaching an attachment member that is non-movably coupled to a rigid support member to at least a portion of the framework adjacent to at least some components, the rigid support member having at least one cable receiving split ring attached thereto that defines a central cable-receiving area and has an opening through which at least one cable may be inserted into the cable-receiving area and at least one additional cable-receiving split ring attached to the attachment portion; and
inserting a plurality of cables attached to the at least some components into the cable receiving area of at least one split ring attached to the rigid support member and another rigid support ring attached to the attachment portion.

22. The method of claim 21 wherein the rigid support member has at least two split rings attached thereto and wherein said inserting comprising inserting at least one cable into the cable receiving areas of at least two split rings.

23. The method of claim 22 wherein each split ring comprises a rigid member that defines the cable-receiving area and has two ends that have a cable-receiving space therebetween and wherein said inserting comprises inserting at least one cable through the cable-receiving space and into the cable-receiving area.

24. The method of claim 21 wherein said attaching comprises attaching the rigid support member to the framework such that the rigid support member is adjacent a lateral side of a plurality of the components.

25. A cable support apparatus, comprising:
an elongated support member;
at least one cable-receiving split ring attached to said elongated support member;
a first attachment member non-movably attached to one end of said elongated support member;
a second attachment member non-movably attached to another end of said elongated support member; and
at least one auxiliary split ring attached to said first attachment member and at least one other auxiliary split ring attached to said second attachment member.

26. The apparatus of claim 25 wherein at least one said cable-receiving split ring is fabricated from a metal rod.

27. The apparatus of claim 25 wherein said elongated support member has a cross-sectional selected from the group of cross-sectionals shapes consisting of T-shaped, I-shaped, rectangular-shaped, and circular-shaped.

28. The apparatus of claim 25 wherein said elongated support member is fabricated from a material selected from the group of materials consisting of steel, stainless steel, aluminum, and plastic.

29. A cable support apparatus, comprising:
an elongated support member having at least one attachment portion integrally formed thereon and perpendicularly protruding from an end of said elongated support member for attaching said elongated support member to an object in a spaced-apart relationship thereto; and
at least one cable-receiving split ring non-movably attached to said elongated support member, said at least one cable-receiving support member defining a cable-receiving area having a perimeter surrounded by a rigid barrier, said rigid barrier having an opening therethrough through which at least one cable may be inserted.

30. The cable support apparatus of claim 29 wherein said cable-receiving split rings are welded to said elongated support member.

31. The cable support apparatus of claim 30 wherein each said cable-receiving split ring is fabricated from metal rod having a circular cross-sectional shape.

32. A cable support apparatus, comprising:
an elongated support member;
at least one cable-receiving support member attached to said elongated support member, said at least one cable-receiving support member defining a cable-receiving area having a perimeter surrounded by a rigid barrier, said rigid barrier having an opening therethrough through which at least one cable may be inserted;
a first attachment member attached to one end of said elongated support member, said first attachment member having at least one first attachment tab attached thereto; and
a second attachment member attached to another end of said elongated support member and having at least one said second attachment tab attached thereto.

33. The apparatus of claim 32 further comprising at least one fastener hole through each of said first and second attachment tabs.

34. A cable support apparatus, comprising:
an elongated support member;
at least one cable-receiving split ring attached to said elongated support member;
a first attachment member attached to one end of said elongated support member and having at least one first attachment tab attached thereto;
a second attachment member attached to another end of said elongated support member and having at least one second attachment tab attached thereto; and
at least one auxiliary split ring attached to one of said first and second attachment members.

35. The cable support apparatus of claim 34 further comprising at least one fastener hole in each of said first and second attachment tabs.

* * * * *